Aug. 3, 1937. R. E. SLIFE ET AL 2,089,137
SHIFTING DEVICE FOR TRACTOR CULTIVATORS
Filed Jan. 9, 1937
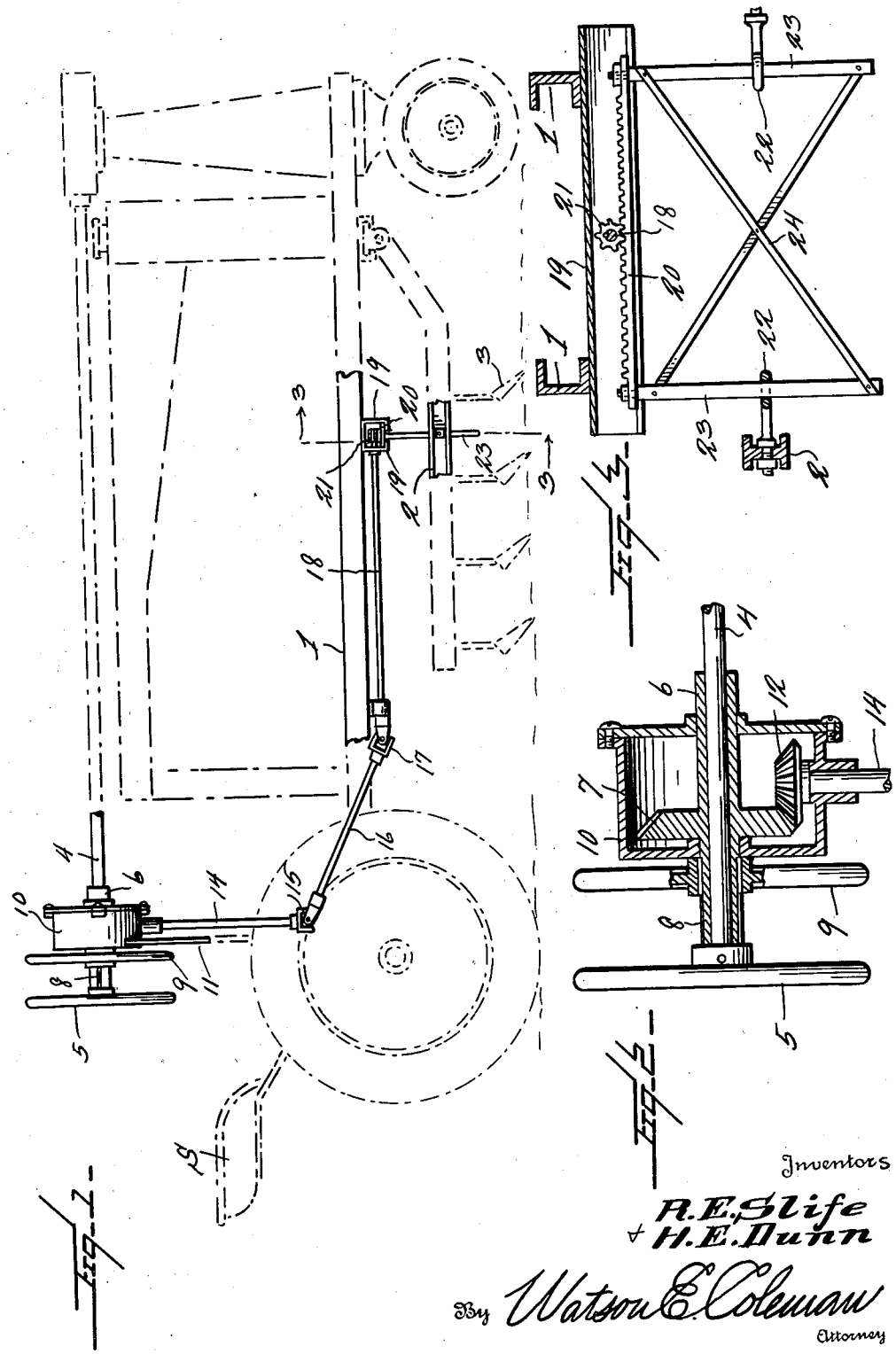
Inventors
R. E. Slife
& H. E. Dunn
By Watson E. Coleman
Attorney Patented Aug. 3, 1937

2,089,137

UNITED STATES PATENT OFFICE 2,089,137

SHIFTING DEVICE FOR TRACTOR CULTIVATORS

Ralph E. Slife, Springville, and Harry E. Dunn, Marion, Iowa

Application January 9, 1937, Serial No. 119,860

7 Claims. (Cl. 97—47)

This invention relates to a shifting device for a tractor cultivator, and it is an object of the invention to provide a device of this kind which is operated by an auxiliary control wheel positioned forward of and closely adjacent to the steering wheel of the tractor proper, the operation of the auxiliary control wheel and the steering wheel being independent one of the other, or both of said wheels may be caused to operate in unison.

The invention also has for an object to provide a shifting device for the plows of a tractor cultivator readily operated by the operator of the tractor occupying the usual seat.

An additional object of the invention is to provide a device of this kind which can be readily placed upon a tractor new or old and wherein the device is one which embodies features of economy of space and freedom from injury to equipment.

The invention consists in the details of construction and in the combination and arrangement of the several parts of our improved shifting device for a tractor cultivator whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a diagrammatic view in side elevation illustrating a shifting device for a tractor cultivator constructed in accordance with an embodiment of our invention, the general outlines of the tractor and the plows being indicated by broken lines;

Figure 2 is an enlarged fragmentary view partly in section and partly in elevation illustrating the mounting of the control wheel for the shifting device and the parts directly associated therewith;

Figure 3 is a fragmentary sectional view taken substantially on the line 3—3 of Figure 1.

In the present embodiment of our invention, 1 denotes the conventional type of side members comprised in the frame of the tractor and operatively engaged with the forward portions of these side members 1 at points preferably inwardly of the front steering wheels are the beams 2 carrying the cultivating plows 3. These parts are conventional and may, of course, be varied as the requirements of practice deem necessary. The tractor is also of a type which includes a horizontally disposed steering shaft 4 supported in a conventional manner upon the tractor and which shaft extends to the rear of the tractor in proximity to the driver's seat S where the shaft is provided with a steering wheel 5. Freely mounted upon the shaft 4 forward of the steering wheel 5 is an elongated sleeve 6, the intermediate portion of which having integrally formed therewith a beveled gear 7 of desired radius. Keyed, as at 8, to the sleeve 6 for rotation therewith but free for sliding movement lengthwise thereof is a control wheel 9 of a diameter substantially the same as the diameter of the steering wheel 5. This mounting of the control wheel 9 is on that end portion of the sleeve 6 immediately adjacent to the steering wheel 5 so that such wheel 9 may be readily drawn forwardly in such position with respect to the wheel 5 to allow the occupant of the seat S to grasp both of the wheels to operate the same in unison or to allow the wheel 9 to be pushed forwardly when not in use to the position as illustrated in Figures 1 and 2 so that said wheel 9 will offer no hindrance or obstruction to the normal steering operation of the wheel 5.

Mounted upon the sleeve 6 and housing the gear 7 is a box 10 of required dimensions, said box being suitably anchored to the structure of the tractor by supporting braces 11 arranged at opposite sides of the box 10. The sleeve 6 and, of course, the shaft 4 extend through this box 10. The gear 7 within the box 10 has meshing therewith a beveled pinion 12 carried by the upper end portion of a vertically disposed shaft 14 supported in any conventional manner upon the tractor structure. This shaft 14 extends downwardly as desired and has its lower extremity connected by a universal joint 15 with a downwardly and forwardly directed shaft section 16 which in turn is in connection by the universal joint 17 with the forwardly disposed and substantially horizontal shaft section 18 operatively supported by the tractor structure and preferably underlying the supporting frame. The side members 1 of the frame of the tractor at a desired point above the plow beams 2 have suitably secured thereto the transversely disposed trackway 19 with which slidably engages a rack bar 20 of desired length, said bar 20 being readily movable lengthwise in either direction transversely of the tractor.

The forward end portion of the shaft 18 carries a gear 21 meshing with the rack bar 20 so that upon required rotation of the control wheel 9 the rack 20 will be moved in the desired direction to effect the desired shifting of the plow beams 2. To effect this shifting of the plow beams 2 with the rack bar 20, each of said beams 2 at a suitable point therealong carries an inwardly directed eye member 22 through which is freely disposed a depending rigid bar 23 carried by an end portion of the rack bar 20. The two bars 23 as particularly illustrated in Figure 3, are fixedly maintained and reinforced by the brace rods 24. It is also to be stated at this time that upon lifting of the plow beams 2 at the end of a row in the conventional or well known manner, the eye members 22 will readily shift upwardly along the bars 23 and that as the plowing deepens the eye members 22 will readily shift downwardly of the bars 23. It is, therefore, to be noted that the plow beams 2 will be held rigid at all times except as the turn of the control wheel 9 causes said beams 2 to be shifted by the pull or push imposed on the beams through the eye members 22.

From the foregoing description it is thought to be obvious that a shifting device for a tractor cultivator constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. The combination with a tractor including an operating shaft for the steering mechanism of the tractor and having an operating wheel adjacent to the operator's seat together with ground working means operatively engaged with the tractor in a conventional manner for raising and lowering movement and also for movement transversely of the tractor, a rack supported by the tractor structure for movement transversely thereof, means carried by the tractor engaging the ground working means for shifting the ground working means transversely of the tractor structure as the rack is moved transversely of such structure, a control wheel loosely mounted upon the shaft adjacent to the operating wheel on said shaft, and means operated upon rotation of the control wheel for shifting the rack in its movements transversely of the tractor structure, said control wheel being also mounted for movement toward and from the operating wheel to permit the control wheel to be positioned in proximity to the operating wheel to enable the operator to grasp both the operating wheel and the control wheel for turning the same in unison.

2. The combination with a tractor including an operating shaft for the steering mechanism of the tractor and having an operating wheel adjacent to the operator's seat together with ground working means operatively engaged with the tractor in a conventional manner for raising and lowering movement and also for movement transversely of the tractor, a rack supported by the tractor structure for movement transversely thereof, means carried by the tractor engaging the ground working means for shifting the ground working means transversely of the tractor structure as the rack is moved transversely of such structure, a control wheel mounted loosely upon the operating shaft adjacent to the operating wheel on said shaft, and means operated upon rotation of the control wheel for shifting the rack in its movements transversely of the tractor structure, said control wheel being also mounted for movement toward and from the operating wheel to permit the control wheel to be positioned in proximity to the operating wheel to enable the operator to grasp both the operating wheel and the control wheel for turning the same in unison, said operating wheel and control wheel being of substantially the same major diameters.

3. The combination with a tractor including an operating shaft for the steering mechanism of the tractor and having an operating wheel adjacent to the operator's seat together with ground working means operatively engaged with the tractor in a conventional manner for raising and lowering movement and also for movement transversely of the tractor, a rack supported by the tractor structure for movement transversely thereof, means carried by the tractor engaging the ground working means for shifting the ground working means transversely of the tractor structure as the rack is moved transversely of such structure, a sleeve freely mounted on the shaft adjacent to the operating wheel, a control wheel mounted on the sleeve for rotation therewith but having independent movement lengthwise of the sleeve, said control wheel when shifted in one direction along the sleeve closely approaching the operating wheel so that the operator can grasp both the operating wheel and the control wheel for rotating the same in unison, and an operative connection between the sleeve and the rack for shifting the rack transversely of the tractor structure upon rotation of the control wheel.

4. The combination with a tractor including an operating shaft for the steering mechanism of the tractor and having an operating wheel adjacent to the operator's seat together with ground working means operatively engaged with the tractor in a conventional manner for raising and lowering movement and also for movement transversely of the tractor, a rack supported by the tractor structure for movement transversely thereof, means carried by the tractor engaging the ground working means for shifting the ground working means transversely of the tractor structure as the rack is moved transversely of the tractor structure, a control wheel loosely mounted upon the operating shaft adjacent to the operating wheel on said shaft, an articulated shaft, one end portion of said shaft being in driving connection with the rack and the opposite end portion being in driven connection with the control wheel, said articulated shaft extending below the tractor structure and therebeneath toward the rack.

5. The combination with a tractor including an operating shaft for the steering mechanism of the tractor and having an operating wheel adjacent to the operator's seat together with ground working means operatively engaged with the tractor in a conventional manner for raising and lowering movement and also for movement transversely of the tractor, a rack supported by the tractor structure for movement transversely thereof, means carried by the tractor engaging the ground working means for shifting the ground working means transversely of the tractor structure as the rack is moved transversely of such structure, a sleeve freely mounted on the shaft and positioned adjacent to the operating wheel, a control wheel mounted upon the sleeve for rotating the same, a gear rotating with the sleeve, a box mounted upon the sleeve and housing the gear carried by the sleeve, means for supporting said box in a fixed position upon the tractor structure, a shaft section depending from the box having an end portion extending within the box, a gear carried by the end portion of the shaft section within the box meshing with the gear carried by the sleeve, a shaft section mounted upon the tractor structure and in operative engagement with the rack, and an operative connection between the two shaft sections constructed and arranged to impart movement to the rack transversely of the tractor structure upon rotation of the control wheel.

6. In combination with a tractor and ground working means including beams operatively engaged with the tractor in a conventional manner for raising and lowering movement and also for movement transversely of the tractor, a member supported by the tractor structure for movement transversely thereof, rigid bars depending from said member, eye members carried by the beams through which said rigid bars are freely directed, and means for shifting the member.

7. The combination with a tractor including an operating shaft for the steering mechanism of the tractor and having an operating wheel adjacent to the operator's seat together with ground working means operatively engaged with the tractor in a conventional manner for raising and lowering movement and also for movement transversely of the tractor, a rack supported for movement transversely of the tractor structure, means carried by the tractor engaging the ground working means for shifting the ground working means as one unit transversely of the tractor structure as the rack is moved transversely of the plow frame, a control wheel loosely mounted upon the operating shaft adjacent to the operating wheel on said shaft, an articulated shaft, one end portion of said shaft being in driving connection with the rack and the opposite end portion being in driven connection with the control wheel, said articulated shaft extending below the tractor structure and therebeneath toward the rack.

RALPH E. SLIFE.
HARRY E. DUNN.